No. 767,973. PATENTED AUG. 16, 1904.
J. S. STONE.
METHOD OF INCREASING THE EFFECTIVE RADIATION OF
ELECTROMAGNETIC WAVES.
APPLICATION FILED OCT. 30, 1903.
NO MODEL. 7 SHEETS—SHEET 1.

Fig. 1.

No. 767,973. PATENTED AUG. 16, 1904.
J. S. STONE.
METHOD OF INCREASING THE EFFECTIVE RADIATION OF
ELECTROMAGNETIC WAVES.
APPLICATION FILED OCT. 30, 1903.
NO MODEL. 7 SHEETS—SHEET 2.

WITNESSES. INVENTOR.

No. 767,973. PATENTED AUG. 16, 1904.
J. S. STONE.
METHOD OF INCREASING THE EFFECTIVE RADIATION OF ELECTROMAGNETIC WAVES.
APPLICATION FILED OCT. 30, 1903.
NO MODEL. 7 SHEETS—SHEET 3.

No. 767,973. PATENTED AUG. 16, 1904.
J. S. STONE.
METHOD OF INCREASING THE EFFECTIVE RADIATION OF
ELECTROMAGNETIC WAVES.
APPLICATION FILED OCT. 30, 1903.
NO MODEL. 7 SHEETS—SHEET 5.

WITNESSES.
INVENTOR.

No. 767,973. PATENTED AUG. 16, 1904.
J. S. STONE.
METHOD OF INCREASING THE EFFECTIVE RADIATION OF ELECTROMAGNETIC WAVES.
APPLICATION FILED OCT. 30, 1903.

NO MODEL. 7 SHEETS—SHEET 6.

WITNESSES. INVENTOR.

No. 767,973. Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

METHOD OF INCREASING THE EFFECTIVE RADIATION OF ELECTROMAGNETIC WAVES.

SPECIFICATION forming part of Letters Patent No. 767,973, dated August 16, 1904.

Application filed October 30, 1903. Serial No. 179,222. (No model.)

*To all whom it may concern:*

Be it known that I, JOHN STONE STONE, a citizen of the United States, residing at Cambridge, in the county of Middlesex and State of Massachusetts, have invented certain new and useful Improvements in Methods of Increasing the Effective Radiation of Electromagnetic Waves, of which the following is a specification.

My invention relates to the transmission of signals by electromagnetic waves of a kind that were discovered and investigated by Prof. Andre Eugene Blondel, of Paris, in 1898, and it more particularly relates to methods of increasing the effective radiation of these waves from an elevated conductor.

The properties and characteristics of electromagnetic waves radiated from an elevated conductor have long been well known and are clearly set forth in the following publications: *Association Français pour l'Avancement des Sciences, Compte Rendu de la 27ᵉ Session*, Nantes, August 11, 1898, part 2, page 212, Prof. A. E. Blondel; *Séances de la Société Français de Physique*, Paris, May 5, 1899, 2ᵉ fascicule, page 48, Dr. Andre Broca; *Electrical Review*, Vol. 44, May 5, 1899, London, page 746, Blondel; *Electrical Review*, Vol. 44, May 12 and 19, 1899, London, pages 795 and 799, J. E. Taylor; *Comptes Rendus des Séances de l'Academie des Sciences*, Tome CXXX, May 21, 1900, Paris, page 1383, Blondel. A brief exposition of the theory of the radiation of electromagnetic waves from an elevated conductor is also to be found in the United States Patent No. 706,746, dated August 12, 1902, to which reference is herein made for further information concerning their properties and mode of propagation. Attention, however, is called to an inaccuracy in the paper hereinbefore referred to read by Blondel before the French Association for the Advancement of Science—viz., that currents are developed by electromagnetic waves in a plate of conducting material interposed between the spark-terminals of a Hertz oscillator in the equatorial plane thereof, whereas this plate being in the equatorial—*i. e.*, the equipotential—plane of the oscillator will have no currents developed therein except such currents as are created therein in the immediate neighborhood of the oscillator, owing to the fact that the lines of electric force are not everywhere normal to the equatorial plane until a point equal to a quarter-wave length of the transmitted wave away from the oscillator is reached. Likewise when the elevated conductor is grounded no currents are created in the earth, which is then the equatorial or equipotential plane of the vertical oscillator or elevated conductor except such slight currents as are created therein in the immediate neighborhood of the transmitting-wire, owing to the fact that the lines of electric force are not everywhere normal to said surface until the quarter-wave length is reached and also owing to the fact that the surface of the earth is not a perfect conductor and except such currents as are created therein when this surface over which the waves travel suddenly changes direction. Attention is further called to an inaccuracy in Patent No. 706,746, in which is repeated the same error which is to be found in the paper above mentioned by J. E. Taylor in the London *Electrical Review*—viz., that the energy received by a given aerial varies inversely as a given distance, whereas said energy varies inversely as the square of a given distance.

Having thus set forth the bibliography of electromagnetic-wave propagation from a grounded elevated conductor and having cautioned those wishing to practice this invention against the errors found in such bibliography, it will be necessary only to explain in this specification that these waves are radiated by creating electric oscillations in a grounded elevated conductor, preferably vertically elevated; that they consist of two components, one of which (the electric) is normal to the surface of the earth and the other of which (the magnetic) is parallel to the surface of the earth, as set forth in my Letters Patent No. 725,634, April 14, 1903, and that they travel over the surface of the earth, water, or other natural media with which said elevated conductor or transmitting-wire is connected, even although all parts of said surface of the earth, water, or other natural media do not lie in the same plane or in the same straight line. I have experimentally determined that the effective radiation of these waves can be increased by artificially increasing the natural electrical conductivity of the surface of the earth or other natural media in the immediate vicinity of the base of the transmitting-wire and maintaining said surface in a constantly-conducting state. I have also determined that the area of this surface necessary to be maintained in a more highly conducting condition in order that the radiation may be most effectively increased is the area of a circle whose center is the base of the elevated conductor and whose radius is equal, approximately, to a quarter-wave length of the transmitted wave. It has sometimes been observed that on hot dry days it is impossible to transmit electromagnetic waves from a grounded elevated conductor. I have experimentally determined that this breaking down of a wireless-telegraph transmitting system cannot occur if the natural electrical conductivity of the surface of the earth surrounding the base of the elevated conductor be increased by artificial means and maintained in such state of increased electrical conductivity in the manner described in this specification.

In the drawings which accompany and form a part of this specification, Figs. 2ª to 12 are diagrams hereinafter referred to in explaining the theory of the radiation of electromagnetic waves from an earthed elevated conductor.

Figure 1:
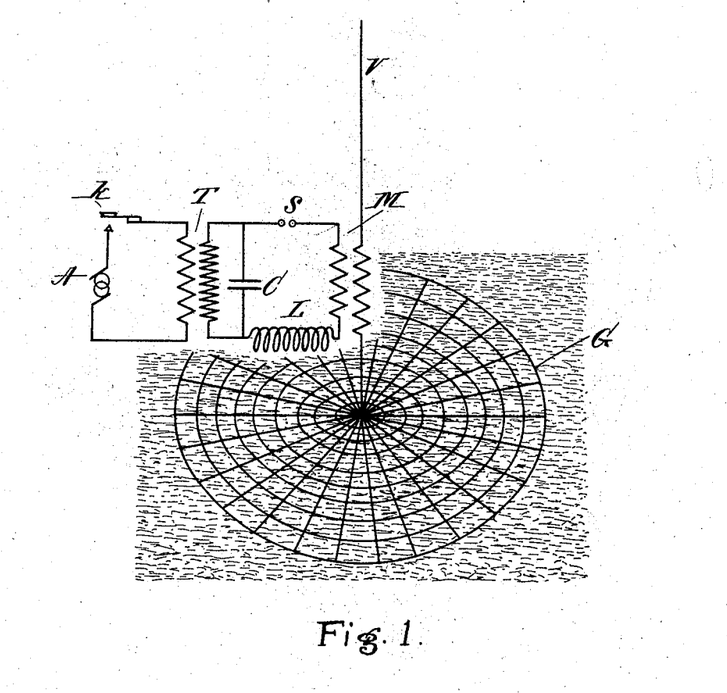
Figure 1 is a diagrammatic illustration of one embodiment of my invention.
Figure 2A:
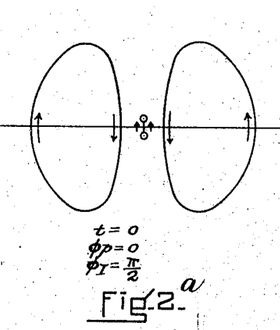
Figure 2B:
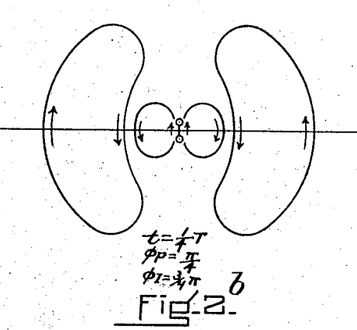
Figure 2C:
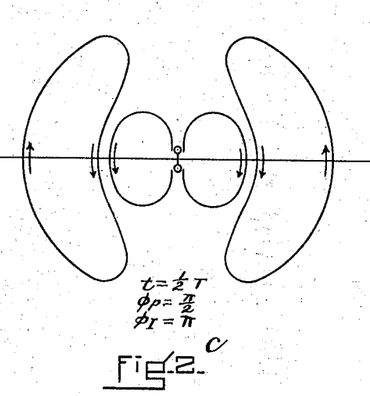
Figure 2D:
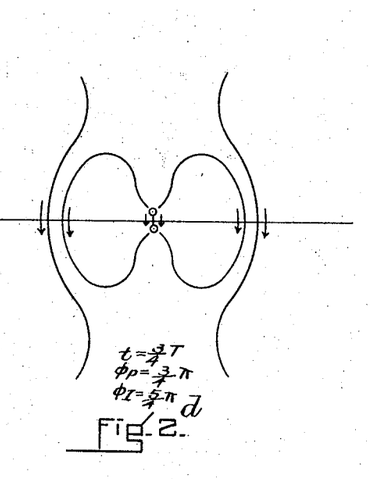
Figure 3A:
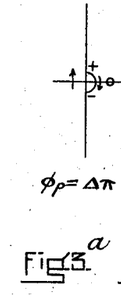
Figure 3B:
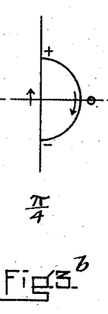
Figure 3C:
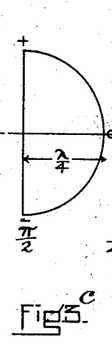
Figure 3D:
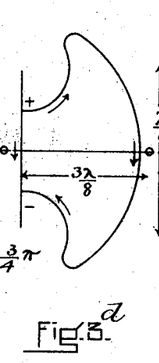
Figure 3E:
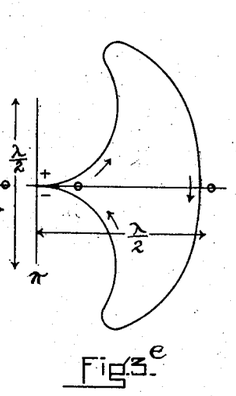
Figure 3F:
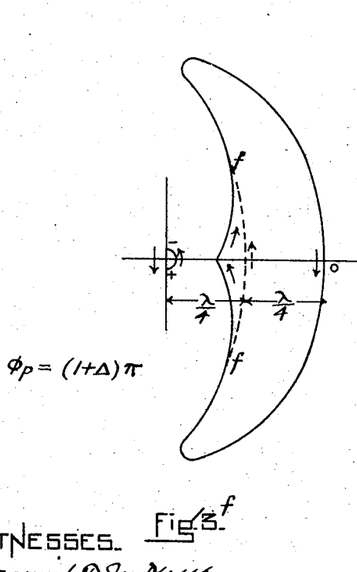
Figure 3G:
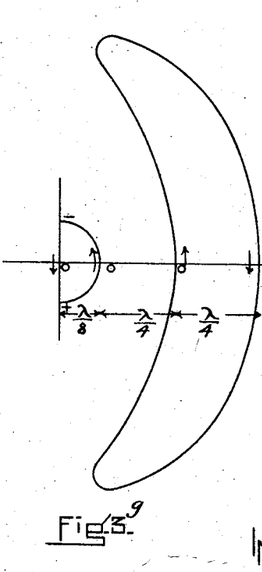
Figure 4A:
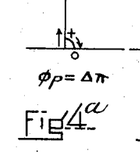
Figure 4B:
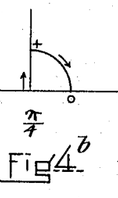
Figure 4C:
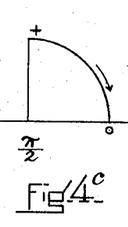
Figure 4D:
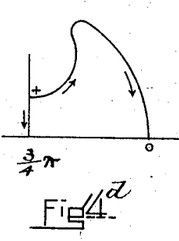
Figure 4E:
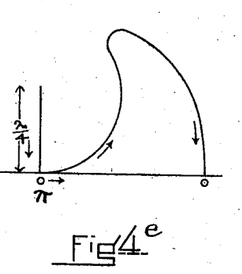
Figure 4F:
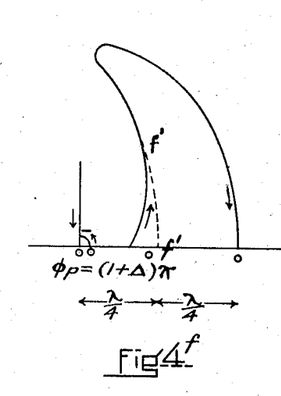
Figure 4G:
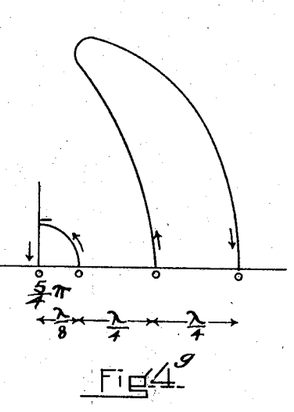

In Fig. 1, a is a source of varying electromotive force, which is here shown as an alternating-current generator. k is a key. T is a step-up transformer. C is a condenser. s is a spark-gap. L is an inductance. M is a transformer, preferably a step-up transformer. V is an elevated conductor or transmitting-wire. G represents in diagram means whereby the natural radial electrical conductivity of the surface of the earth in the neighborhood of the base of the elevated conductor is increased and maintained in a highly-conducting state.

For the construction of the transmitting apparatus and circuit arrangements and the mode of operation thereof reference may be had to my prior Letters Patent, Nos. 714,756 and 714,832, dated December 2, 1902. It is sufficient to here state that by means of the apparatus made in accordance with the specifications of said Letters Patent electrical oscillations, which preferably approximate the sinusoidal or simple harmonic form as closely as practicable, are impressed or forced upon the elevated conductor, either inductively or conductively connected with the sonorous or closed persistently-oscillating circuit M L C s. However, the transmitting apparatus and circuit arrangements herein shown are merely intended to be illustrative of any transmitting system, and it is to be understood that unless otherwise stated I do not desire my claims to be limited to any particular transmitting system, inasmuch as it is obvious that my invention may be used with any system whereby the radiation of electromagnetic waves is effected.

For making the surface of the earth more highly conducting and maintaining it in a constantly-conducting state a multiplicity of substances may be used. In the drawings I have illustrated one embodiment of my invention in which metallic wire-netting of large mesh, known as "chicken-coop" netting, is placed in electrical contact with the earth surrounding the lower end of the elevated conductor and is connected to the lower end of said conductor. Such netting has been used successfully for the purpose herein specified. I have also used a layer of commercial calcium chlorid, although any other deliquescent salt, which by virtue of its moisture-absorbing properties will maintain the surface of the earth in a constantly-moistened condition, may be used, and a layer of such salt may with advantage be spread upon the earth within the area covered by the wire-netting. A solution of water and any conducting salt may be used. In fact, I have restored to efficient working order a system by which radiation of electromagnetic waves was rendered impossible by heat and drought by merely moistening the earth with water for a distance from the base of the elevated conductor equal approximately to a quarter-wave length of the transmitted wave. Iron or other metallic wires disposed radially and circumferentially may be used, and also rock-salt, coarse common salt, charcoal, coke, and, in fact, any substance which exhibits a greater degree of electrical conductivity than the earth. When wire-netting or a system of radially and circumferentially extending metallic wires are so employed, it is to be noted that the effect is virtually a substitution of said netting or metallic wires for the earth as a natural guide for the electromagnetic waves.

I have discovered that in order to be most effective for the purpose above specified the means whereby the natural electrical conductivity of the earth or other natural media is increased must extend from the base of the elevated conductor a distance equal approximately to a quarter-wave length of the transmitted wave. The reason for this is that the true radiation of electromagnetic waves does not begin until a point about a quarter-wave length from the elevated conductor is reached, because it is well known that until this point is reached the electric and magnetic components of an electromagnetic wave are not in phase and that slight electric currents are created in the earth up to this point.

Although it is indicated by theory that any means employed to increase the natural electrical conductivity of the earth should extend from the base of the elevated conductor a distance equal to a quarter-wave length of the transmitted wave, it is to be distinctly understood that this length is merely the maximum length which may be advantageously employed, while excellent results may be obtained by using a much shorter length. In other words, the area of the netting or system of wires or other means specified herein may be much smaller than the area of a circle whose radius is equal to a quarter-wave length of the transmitted wave, although better results are obtained as this area is approximated.

The action of an earthed elevated conductor or vertical oscillator, commonly called the "aerial" in wireless telegraphy, and the principles involved in the radiation of electromagnetic waves from such elevated conductor or vertical oscillator may more readily be understood by having reference, first, to a Hertz oscillator and, second, to a simple linear oscillator. The principles involved in the radiation of electromagnetic waves from a Hertz oscillator have been set forth by Hertz in a paper entitled "The Forces of Electric Oscillations, Treated According to Maxwell's Theory," first published in *Wiedemann's Annalen*, Vol. 36, page 1, 1889, and afterward translated by Prof. D. E. Jones and reproduced on pages 136 to 159 of a publication entitled *Electric Waves*, published by Macmillan & Co., London, 1893. Hertz assumed that an infinitely short oscillator consisting of two spheres connected by a wire had developed therein forced simple harmonic electric oscillations, and upon these assumptions he computed the distribution of electric force about the oscillator for definite times and plotted the distribution of the lines of electric force in the neighborhood of the oscillator for such times. In Figs. $2^a$ $2^b$ $2^c$ $2^d$ I have represented this distribution of the electric force by a single line in each instance, instead of a plurality of concentric lines, for times $t = 0$, $t = \frac{1}{4}T$, $t = \frac{1}{2}T$, $t = \frac{3}{4}T$, where T is the half-period of oscillation. Beneath each figure I have represented the potential phase by $\varphi_P$ and the current phase by $\varphi_I$. At time $t = 0$ the potential of the oscillator is zero, and this is indicated in Fig. $2^a$ by the absence of lines of force springing from the poles of the oscillator. The two short arrows adjacent to the oscillator and pointing upward indicate the sense in which the oscillator is about to be charged. The loops or self-closed lines of electric force represent half-waves that have just been formed. The arrows indicate the direction of the lines of electric force, and hence the polarity of the half-wave. At time $t = \frac{1}{4}T$, Fig. $2^b$, the potential of the oscillator has increased and lines of force are seen springing from the poles. At time $t = \frac{1}{2}T$, Fig. $2^c$, the potential of the oscillator is at a maximum, and the number of lines of force springing from the poles is therefore a maximum. At time $t = \frac{3}{4}T$, Fig. $2^d$, the lines of electric force are converging toward the oscillator and are converting their energy into magnetic energy. From this point on a portion of each of the outer lines of force begins to detach itself from the oscillator as a self-closed line of force and an equal number of lines of diminished energy sink back into the oscillator until time $t = T$, Fig. $2^a$, when the process is completed and another half-wave is formed. This half-wave would be represented in Fig. $2^a$ by the self-closed lines therein shown with the arrows reversed. A more detailed explanation of the phenomena briefly outlined above is to be found on pages 143 to 148 of the paper above referred to in *Electric Waves*. Careful consideration of the diagrams just described and the theory underlying them will show that in the equatorial plane the potential is everywhere zero, the electric force is everywhere normal, and the magnetic force is everywhere parallel to this plane. With this review of the treatment of the oscillator by Hertz reference may now be had to a simple linear oscillator of finite dimensions in which forced simple harmonic electric vibrations are developed and in which the finite velocity of electric propagation along the oscillator is considered. In this connection it may be remarked that inasmuch as Hertz assumed his oscillator to be infinitely short (*Electric Waves*, page 146) his analysis of the oscillator neglected the finite velocity of propagation along the wires connecting the spheres of the oscillator, and therefore the characteristic features of diagrams $3^e$ $3^f$ $4^e$ $4^f$ are lost in the diagrams based on his formulæ. It is also explained that because of this assumption the lines of force in the Hertz diagrams are not continued right up to the representation of the oscillator because his formulæ are inadequate in the neighborhood of the finite oscillator shown in his diagrams.

A simple linear oscillator of finite dimensions impressed with forced simple harmonic electric oscillations is shown in Figs. $3^a$ to $3^g$, inclusive, the phase of the potential being indicated at the base of each figure. In Figs. $3^a$ and $3^f$, $\triangle$ represents a quantity small compared to one-fourth. In Fig. $3^a$ the potential is slightly greater than zero, the arrow parallel to the oscillator indicates the sense in which the oscillator is being charged, and the arrow placed adjacent to the line of electric force indicates the direction of the latter. In Fig. $3^b$ the charge has traveled half-way to the ends of the oscillator. This figure corresponds to Fig. $2^b$. In Fig. $3^c$ the lines of force have reached the ends of the oscillator and the potential energy of the oscillator is at its maximum value. This figure corresponds to Fig. 2$^c$. The charge and hence the lines of force are now reflected from the ends of the oscillator, and in Fig. 3$^d$ each line has traveled half-way toward the origin. The arrow parallel to the oscillator is reversed in direction to indicate this change in direction of the moving charge. This figure corresponds to Fig. 2$^d$. In Fig. 3$^e$—i. e., at phase $\pi$ or time $t=T$—the two ends of the line of electric force on the oscillator have met at the origin and the electric force has traveled outward a distance equal to a half-wave length $\frac{\lambda}{2}$ in the equatorial plane. It will now be noted that the electric force travels outward in the equatorial plane and upward and downward along the oscillator at substantially equal velocities. In Fig. 3$^e$ the potential energy of the oscillator is zero and the kinetic energy is a maximum. In Fig. 3$^f$ the next half-oscillation is shown as just beginning, the arrow indicating its direction, which is the reverse of that shown in Fig. 3$^a$. In these figures it will be observed that again the potential at all parts of the equatorial plane is zero and the magnetic force is always parallel to the equatorial plane, but that it is not until the quarter-wave length is reached that the electric force is always normal to the equatorial plane. In explanation of this attention is called to the fact that in an oscillator of finite dimensions it is necessary to consider the propagation of the electric force along the oscillator at finite velocity and to the further fact that when the condition shown in Fig. 3$^e$ is reached the inner part of the self-closed lines of electric force proceeds outwardly in the equatorial plane toward the outer part of said lines at first with infinite velocity which gradually diminishes until a distance equal to the quarter-wave length from the origin is reached, where the inner part of said lines becomes normal to the equatorial plane, as shown by the dotted line $f'f'$, Fig. 3$^f$, and where the velocity becomes equal to the velocity of light. In Fig. 3$^g$ the wave thus completely formed at a point equal to a quarter-wave length away from the origin with its magnetic and electric components in phase with respect to time or distance, but in quadrature with respect to space, has proceeded outward a distance equal to an eighth-wave length and the charge on the oscillator has proceeded a distance equal to an eighth-wave length toward the ends of the oscillator and an eighth-wave length outward in the equatorial plane.

Figure 12:
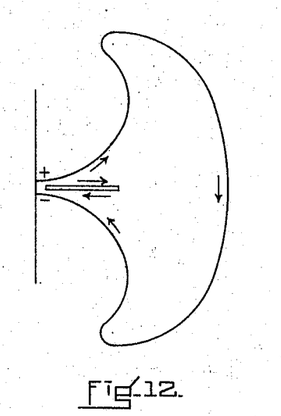

The principles involved in the radiation of electromagnetic waves from a simple linear oscillator may be applied to the solution of the earthed elevated conductor or vertical oscillator of wireless telegraphy by the simple expedient of considering the surface of the earth as the equatorial plane of the simple linear oscillator. The actions taking place in the elevated conductor may then be represented by Figs. 4$^a$ to 4$^g$, inclusive, and are seen to be identical with those taking place above the equatorial plane in Figs. 3$^a$ to 3$^g$, respectively. In this case the magnetic force is everywhere parallel to the surface of the earth; but it is not until the quarter-wave length is reached that the electric force is everywhere normal to the surface of the earth, as indicated by the dotted line $f''f''$ in Fig. 4$^f$. The earth remains at zero potential throughout, and no currents are developed in it except within the distance equal to a quarter-wave length $\frac{\lambda}{4}$ from the base of the elevated conductor, as indicated in Figs. 3$^e$, 3$^f$, 4$^e$, 4$^f$. If the earth be made highly conducting in the immediate vicinity of the oscillator, the currents there developed will not materially change the potential of the earth from zero. If a conductor be placed in the equatorial plane of the linear oscillator—say radially and within the distance $\frac{\lambda}{4}$—then by Figs. 3$^e$ and 3$^f$ it will be seen that there is a large component of electric force parallel to the conductor and that equal and opposite currents will be developed upon its upper and lower surfaces. This is indicated in Fig. 12. If the conductor be a perfect conductor, its potential would still be zero throughout regardless of the current flowing; but it must be of very low conductivity or the current must indeed be excessively great in order to produce an appreciable disturbance of its potential.

Figure 12A:
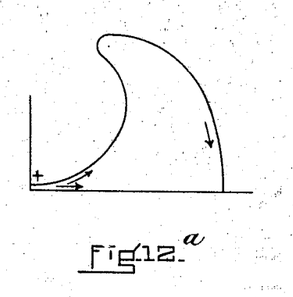

In Fig. 12$^a$ it will be seen that in the case of an earthed elevated conductor there is likewise a large component of electric force parallel to the surface of the earth and that currents are therefore developed in said surface until a point equal to a quarter-wave length of the transmitted wave away from the base of the elevated conductor is reached, at which point the electric force becomes normal to the surface of the earth and its component parallel to said surface vanishes, and consequently the current developed in the earth is reduced to zero. It is therefore apparent that although the currents in the earth are a maximum at the base of the elevated conductor and gradually diminish to zero at the quarter-wave length it is not essential that the means described in this application for increasing the natural electrical conductivity of the earth should extend a distance equal to a quarter-wave length away from the base of the elevated conductor, and it is for this reason that I have stated in some of my claims that said means should extend outwardly "a distance equal approximately to a quarter wave length of the transmitted wave," meaning thereby that such means should extend outwardly "a distance sufficiently great for the purpose specified"—namely, the purpose of increasing the radiation of electromagnetic waves from the elevated conductor. In this connection it is to be observed that this explanation of wave propagation and the diagrams illustrating the same are based upon the formation of waves twice the length of the linear oscillator or four times the length of the grounded oscillator, this being the wave length of the fundamental of the natural vibrations of such oscillator, whereas with forced vibrations this relation is not essential. In such case the wave length may be many times the height of the elevated conductor; but this will not necessitate greatly increasing the extent of the artificial ground herein described beyond what it would be for waves four times the height of the vertical.

In the diagrams hereinbefore discussed I have represented the distribution of the electric force about the oscillator in a meridian plane by a single line somewhat approximately representing the direction of the electric force, and I have similarly represented the meridian sections of the radiated waves. It will be readily seen, however, that the more complete representation would show many lines approximately concentric with those shown in the diagram. This is most clearly shown by Hertz in his diagrams hereinbefore referred to on pages 144 and 145 of *Electric Waves*, and this I have indicated in the upper part of Fig. 5, in which are represented in meridian section three half-waves proceeding outwardly from a grounded elevated conductor O.

It is to be further noted that the adjacent lines of electric force of two adjacent half-waves are similarly directed and that the lines of magnetic force which are in form concentric circles parallel with the equatorial plane and which have the elevated conductor as their center change their direction with the electric lines.

Figure 5:
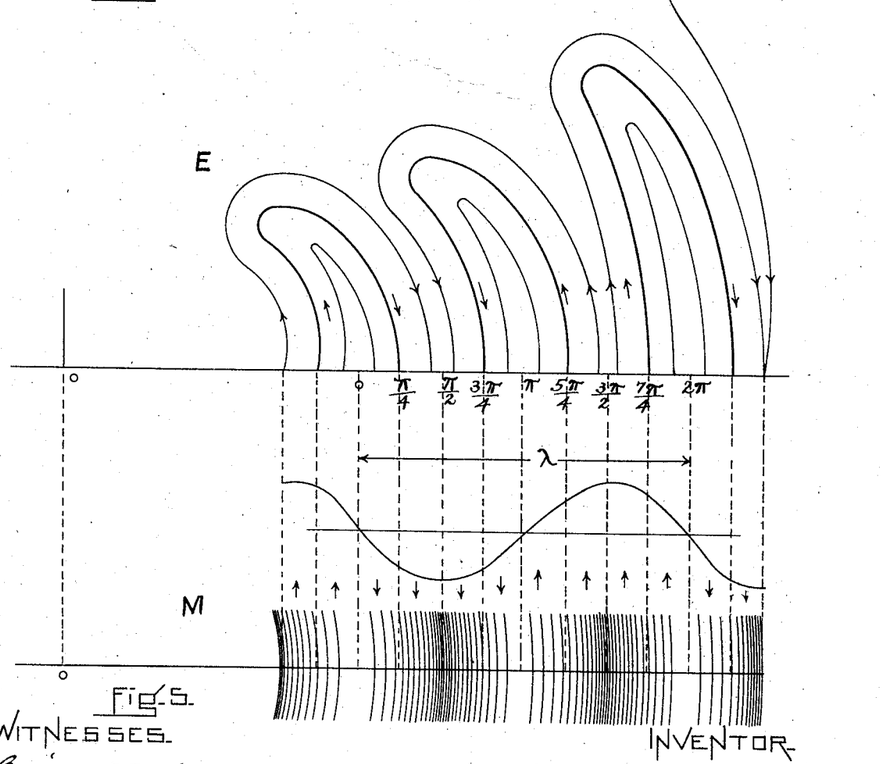

As indicated in Fig. 5, a wave length is the distance measured radially in the equatorial plane between one zero-point, as $o$, to the next zero-point but one, as $2\pi$. The distribution of the lines of force in the equatorial plane—i. e., their density or the number of lines per unit length—determines the shape of the wave. By means of the system described in this application and in my prior patents the shape of the wave is sinusoidal—i. e., the wave is a simple harmonic wave—and therefore the density of the electric force, as well as that of the magnetic force, is a sine function of the distance from the oscillator measured radially in the equatorial plane. The sinusoidal curve between the two parts of Fig. 5 indicates the density of the electric as well as the magnetic force illustrated, respectively, above and below the curve at E and M.

Figure 6:
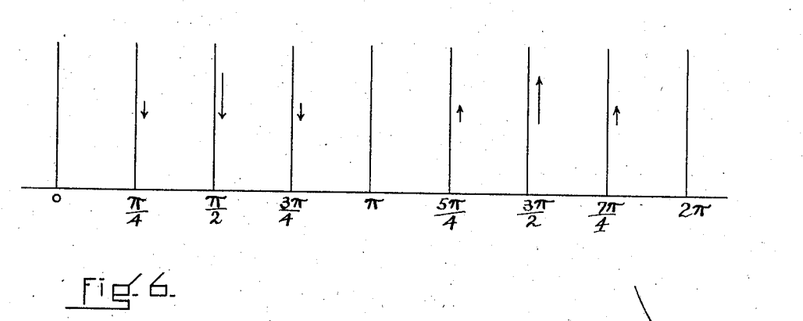

At M in Fig. 5 I have shown a portion of the magnetic lines corresponding to the electric lines shown at E. These magnetic lines are arcs of concentric circles whose center is the oscillator O. Between $o$ and $\pi$ the lines are shown as directed clockwise around O, and between $\pi$ and $2\pi$ they are shown as directed counter-clockwise around the oscillator O to correspond with the change of direction of the electric lines and to indicate the polarity of the forces. It will be observed that as the waves proceed outwardly from the elevated conductor the radius of curvature becomes greater and that at great distances the waves will be practically plane waves because of their great radius of curvature. This is indicated in Fig. 6, which is a representation of the electric lines of the wave shown in Fig. 5 at a great distance from the elevated conductor. The arrows here indicate by their direction and length the direction and density of the electric force throughout the wave length.

Figures 7, 7A:
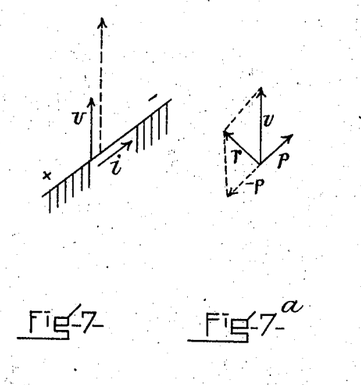
Figure 8:
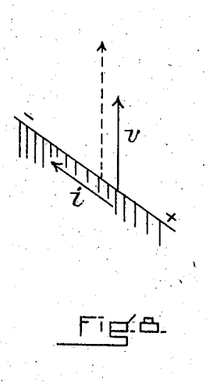
Figure 8A:
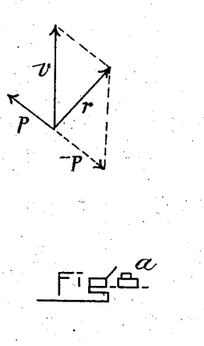
Figures 9, 9A, 10:
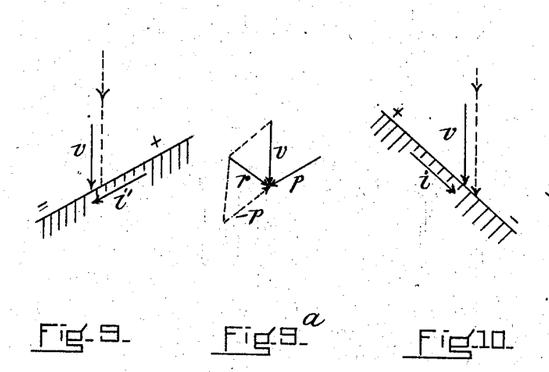
Figure 10A:
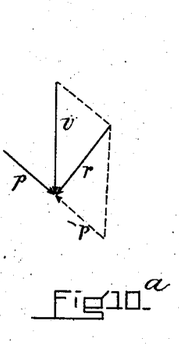
Figure 11:
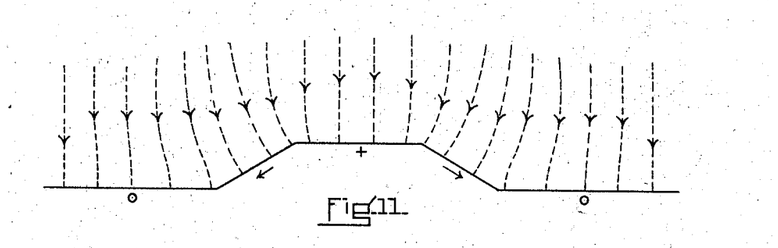
Figure 11A:
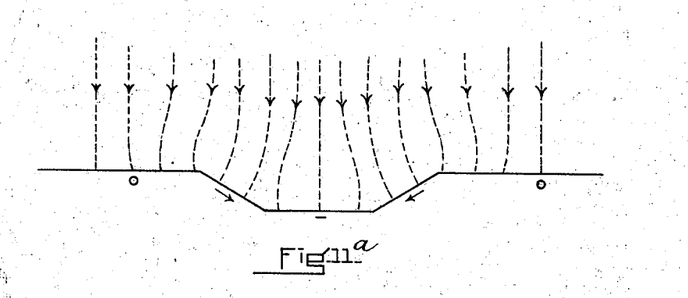

I have hereinbefore stated that no currents are developed by electromagnetic waves in the surface of the earth when an elevated conductor is earthed, except such currents as are developed in said surface in the immediate vicinity of the elevated conductor due to the imperfect conductivity of said surface and which extend theorectically to the distance of a quarter-wave length of the transmitted wave, and except such currents as are developed in said surface when the latter suddenly changes direction—i. e., when it deviates from the equatorial plane. I have explained why currents are developed in the surface of the earth up to a quarter-wave length from the elevated conductor, and I shall now proceed to explain why currents are developed when the said surface deviates from the equatorial plane and why the waves are thereby enabled to pass over such obstacles as hills, &c. Consider one of the lines of electric force shown in Fig. 6 meeting an inclined surface. If $v$, Fig. 7, represents the strength and direction of the electric force, that component of $v$ which is parallel to the inclined surface will be in part absorbed in producing a current in the surface. Such current in the surface is represented by the arrow $i$. If $p$ represents the component of $v$ so absorbed, then the vector difference of $v$ and $p$ —namely, $r$— is both diminished in strength and so deflected as to tend to be normal to the inclined surface, as shown in Fig. 7$^a$. Other cases are shown in Figs. 8, 9, and 10, and the diagrams of forces involved are shown in Figs. 8$^a$, 9$^a$, and 10$^a$, respectively. The result of the foregoing is that the electric force tends to remain normal to the surface of the earth, as shown in Figs. 11 and 11$^a$.

There is no need of current-flow in the earth more than a quarter-wave length from the oscillator except in so far as the surface of the earth deviates from the equatorial plane, and there is no reason for assuming that the potential of the earth differs from zero except for such deviation from the equatorial plane as it may have. In this connection consider Figs. 7, 8, 9, and 10. In Figs. 7 and 8, where the electric force $v$ is directed upward, we see that the current $i$ is opposite in sense, owing to the difference in the slope, and it is clear that if there were no slope there would be no current. Similarly, in Figs. 9 and 10, where the electric force $v$ is directed downward, we see that the current $i$ is opposite in sense, owing to the difference in the slope, and here again it is clear that if there were no slope there would be no current. Moreover, it is well known that if a conductor be placed in the equatorial plane of a Hertz or linear oscillator at a greater distance than $\frac{\lambda}{4}$ from the oscillator there is no component of electric force parallel to the conductor nor is the conductor cut by any line of magnetic force. There is therefore no tendency to develop a current in said conductor, (see *Electric Waves*, page 109;) but if a conductor be placed in the equatorial plane—say radially of the linear oscillator and within the distance $\frac{\lambda}{4}$—then by Fig. 12 we see that there is a large component of the electric force parallel to the conductor and that equal and opposite currents will be developed upon its upper and lower surfaces. If the conductor in question is a perfect conductor, its potential would still be zero throughout regardless of the currents flowing; but it must, indeed, be of very low conductivity or the current must, indeed, be excessively great in order to produce an appreciable disturbance of its potential.

Whereas heretofore it has been alleged that by means of a construction somewhat similar to that described herein, but in the form of a conducting-strip extending from the transmitting-station in the general direction of the receiving-station, a certain directive effect may be obtained, it is herein pointed out that no such directive effect can be obtained in the manner alleged. In explanation of the foregoing reference is to be had to Huyghen's principle, which is applicable to all free waves in an unlimited medium and by which the waves would proceed to spread in all directions as soon as they have passed beyond the limit of the conducting-strip laid upon the earth's surface in much the same way that sound-waves proceed to spread in all directions after leaving the end of an organ-pipe, in which they are limited, and passing out into the air. It is not with this alleged directive effect that this invention is concerned, and I desire it to be understood that I here disclaim the use of the invention herein described for such purpose.

Whereas heretofore it has been alleged that by means of a construction somewhat similar to that described herein the capacity and inductance of the vertical transmitting-wire are increased or at least maintained constant irrespective of climatic and other conditions, such as changes of electrical conductivity of the surface of the earth in the immediate neighborhood of said transmitting-wire due to salt spray, &c., it is herein pointed out that even when the surface of the earth has the minimum natural conductivity possible under the most unfavorable conditions the capacity of the vertical wire is definite and uninfluenced by the degree of conductivity of the surface of the earth for the same reason that the capacity of a condenser is uninfluenced by the degree of conductivity of the metal employed for the condenser-plates and that the inductance is completely determined entirely irrespective of the conductivity of the surface of the earth, being dependent solely upon the geometric constants and material of said wire. I therefore desire it to be understood that I here disclaim the use of the invention herein described for such purposes.

An apparatus for carrying out the herein-described method has been claimed in my application, Serial No. 179,223, filed October 30, 1903.

I claim—

1. The method of increasing the effective radiation of electromagnetic waves from an elevated conductor, which consists in increasing the natural electrical conductivity of the surface of the earth surrounding said conductor for a radial distance equal approximately to a quarter-wave length of the transmitted wave and in maintaining said surface in a constantly-conducting state by artificial means.

2. The method of increasing the effective radiation of electromagnetic waves from an elevated conductor, which consists in increasing the natural electrical conductivity of the surface of the earth surrounding said conductor for a radial distance equal approximately to a quarter-wave length of the transmitted wave and in maintaining said surface in a constantly-conducting state by means of a covering of material of greater electrical conductivity than that of said surface.

3. The method of increasing the effective radiation of electromagnetic waves from an elevated conductor, which consists in increasing the natural electrical conductivity of the surface of the earth surrounding said conductor for a radial distance equal approximately to a quarter-wave length of the transmitted wave and in maintaining said surface in a constantly-conducting state by means of a layer of a deliquescent salt.

4. The method of increasing the effective radiation of electromagnetic waves from an elevated conductor, which consists of artificially increasing the natural electrical conductivity of the surface of the earth surrounding said conductor for a radial distance equal approximately to a quarter-wave length of the transmitted wave.

5. The method of increasing the effective radiation of electromagnetic waves from an elevated conductor, which consists in substituting for the surface of the earth, as a natural guide for the electromagnetic waves, a metallic netting extending radially from the base of said elevated conductor for a distance equal approximately to a quarter-wave length of the transmitted wave.

6. The method of increasing the effective radiation of electromagnetic waves from an elevated conductor, which consists in substituting for the surface of the earth, as a natural guide for the electromagnetic waves, a metallic netting and a layer of a deliquescent salt extending radially from the base of said elevated conductor for a distance equal approximately to a quarter-wave length of the transmitted wave.

7. The method of increasing the effective radiation of electromagnetic waves from an elevated conductor, which consists in artificially increasing the natural electrical conductivity of the natural medium, to which said conductor is connected for a radial distance approximately equal to a quarter-wave length of the transmitted wave and in maintaining said medium in such state of increased electrical conductivity.

8. The method herein described of increasing the effective radiation of electromagnetic waves from an elevated conductor, which consists in substituting for the surface of the earth, as a natural guide for the electromagnetic waves, a material having greater electrical conductivity than said surface and extending outwardly from the base of said elevated conductor for a distance sufficiently great for the purpose specified.

In testimony whereof I have hereunto subscribed my name this 30th day of September, 1903.

JOHN STONE STONE.

Witnesses:
BENJ. F. HAINES,
ELLEN B. TOMLINSON.